(12) United States Patent
DeBie et al.

(10) Patent No.: US 7,853,493 B2
(45) Date of Patent: Dec. 14, 2010

(54) PERSONAL FINANCE INTEGRATION SYSTEM AND METHOD

(75) Inventors: Tod DeBie, Costa Mesa, CA (US); Michael Burger, Aliso Viejo, CA (US)

(73) Assignee: ConsumerInfo.com, Inc., Irvine, CA (US)

( * ) Notice: Subject to any disclaimer, the term of this patent is extended or adjusted under 35 U.S.C. 154(b) by 0 days.

(21) Appl. No.: 12/141,317

(22) Filed: Jun. 18, 2008

(65) Prior Publication Data

US 2009/0319411 A1 Dec. 24, 2009

(51) Int. Cl.
*G07B 17/00* (2006.01)
*G06Q 40/00* (2006.01)

(52) U.S. Cl. .......................................... 705/30; 705/35
(58) Field of Classification Search ................... 705/30, 705/35
See application file for complete search history.

(56) References Cited

U.S. PATENT DOCUMENTS

| | | | |
|---|---|---|---|
| 5,842,211 A * | 11/1998 | Horadan et al. | 1/1 |
| 5,903,881 A * | 5/1999 | Schrader et al. | 705/42 |
| 7,640,200 B2 * | 12/2009 | Gardner et al. | 705/36 R |
| 7,729,959 B1 * | 6/2010 | Wells et al. | 705/30 |
| 2002/0152166 A1 * | 10/2002 | Dutta et al. | 705/43 |
| 2006/0178971 A1 * | 8/2006 | Owen et al. | 705/35 |

OTHER PUBLICATIONS

Ramaswamy, Vinita M. "Identity-Theft Toolkit". The CPA Journal. New York: Oct. 2006. vol. 76, Iss. 10; p. 66, (5 pages).*

"The Comma Separated Value (CSV) File Format" <http://www.creativyst.com/Doc/Articles/CSV/CSV01.htm> Copyright 2002-2007. Creativyst. Inc. Retrieved Sep. 30, 2009. (11 pages).*

Magid, Lawrence J.. "Business Tools; When Selecting an ASP Ensure Data Mobility :[Home Edition]." Los Angeles Times Feb. 26, 2001,Los Angeles Times (2 pages).*

"Microsoft (MS) Money (MSMoney) FAQ, Help and Information Pages" <http://web.archive.org/web/20071018075531/http://money.mvps.org/faq/article/196.aspx. Retrieved Sep. 30, 2009. (3 pages).*

"Quicken Support" <http://web.archive.org/web/20071231040130/http://web.intuit.com/ support/quicken/docs/d_qif.html. Retrieved Sep. 30, 2009 (7 pages).*

MS Money Software by Microsoft (http://www.microsoft.com/Money/default.mspx), retrieved on Sep. 17, 2008.

(Continued)

*Primary Examiner*—James P Trammell
*Assistant Examiner*—Elda Milef
(74) *Attorney, Agent, or Firm*—Knobbe Martens Olson & Bear LLP (57) ABSTRACT

An integration device retrieves credit reports, and/or other financial data that is available from one or more credit sources, for consumers and extracts financial account information from the credit reports. The integration device may then format and/or translates the account information into a format that is usable by a particular consumer's personal finance software and communicates the account information to the personal finance software. Accordingly, the personal finance software is provided with information regarding each of a plurality of financial accounts that are associated with the consumer so that the account information may be populated in the personal finance software with minimal effort by the consumer.

11 Claims, 7 Drawing Sheets

OTHER PUBLICATIONS

Experian Consumer Credit Report (http:/experian.com/), retrieved on Sep. 17, 2008.
Equifax Consumer Credit Report (http://www.equifax.com/home/), retrieved on Sep. 17, 2008.
TransUnion Consumer Credit Report (http://www.transunion.com/), retrieved on Sep. 17, 2008.
FamilySecure.com (http://www.familysecure.com/), retrieved on Sep. 17, 2008.
Quicken Online by Intuit (http://www.quicken.intuit.com/), retrieved on Sep. 17, 2008.
Expensr.com (http://www.expensr.com/), retrieved on Sep. 17, 2008.
Mint.com (http://www.mint.com/), retrieved on Sep. 17, 2008.
Wesabe.com (http:/www.wesabe.com/), retrieved on Sep. 17, 2008.

* cited by examiner

Account Summary

| | Account Detail | Current Balance | Account Holder | Status |
|---|---|---|---|---|
| Delete ✕ Modify | Bank of America Credit Card | $1,233 | Mike Edwards | Nov Dec Jan Feb Mar Apr May Jun Jul Aug Sep Oct Nov<br>99 99 00 00 00 00 00 00 00 00 00 00 00<br>OK OK OK OK OK OK OK OK OK OK OK OK OK |
| Delete ✕ Modify | Chase Credit Card | $755 | Jan Edwards | Oct Nov<br>00 00<br>OK 30 |
| Delete ✕ Modify | Toyota Finance | $17,895 | Jan Edwards | Nov Dec Jan Feb Mar Apr May Jun Jul Aug Sep Oct Nov<br>99 99 00 00 00 00 00 00 00 00 00 00 00<br>OK OK OK OK OK OK OK OK OK OK OK OK OK |
| Delete ✕ Modify | Wells Fargo Checking | $1,233 | Mike Edwards | Nov Dec Jan Feb Mar Apr May Jun Jul Aug Sep Oct Nov<br>99 99 00 00 00 00 00 00 00 00 00 00 00<br>OK OK OK OK OK OK OK OK OK OK OK OK OK |
| Delete ✕ Modify | ABC Mortgage | $322,995 | Mike Edwards | Nov Dec Jan Feb Mar Apr May Jun Jul Aug Sep Oct Nov<br>99 99 00 00 00 00 00 00 00 00 00 00 00<br>OK OK OK OK OK OK OK OK OK OK OK OK OK |
| Add Delete ✕ Modify | (New) Macy's Credit Card | $0 | Mike Edwards | Oct Nov<br>00 00<br>OK OK |
| Add Delete ✕ Modify | (New) US Dept of Education | $25,233 | Mike Edwards | Oct Nov<br>00 00<br>OK 30 |

User
- Jan Edwards
- Mike Edwards

Nov 2000 Credit Score: 740 (Jan)
Nov 2000 Credit Score: 728 (Mike)
• Review how to improve credit score!

Legend
| OK | Current | 90 | 90 Days Late |
| ND | No Data Provided* | 120 | 120 Days Late |
| 30 | 30 Days Late | KD | Key Derogatory |
| 60 | 60 Days Late | RF | Repossession/Forclosure |
| | | PP | Payment Plan |

Export Data  Dispute Account  Refresh ↻

Sign up for automatic alerts!
Sign up for fraud alert!

FIG. 6

PERSONAL FINANCE INTEGRATION SYSTEM AND METHOD

BACKGROUND OF THE INVENTION

1. Field of the Invention

This application relates to systems and methods integrating financial accounts into a personal finance program.

2. Description of the Related Art

A variety of technologies exist for consumers wishing to utilize a central repository to help manage their financial information. For example, Microsoft Money and Intuit Quicken each allow consumers to enter information regarding their financial accounts and track transactions in those financial accounts. Other entities may also provide similar proprietary and/or open source personal finance software. Some personal finance software allows transactions at many financial institutions to be automatically updated via a secure electronic communication between the personal finance software and a data provider of the financial institution. Thus, when the necessary information for the consumer's financial accounts is entered into the personal finance software, the personal finance software may download recent transactions for the financial accounts on a periodic basis, such as each time the consumer accesses the personal finance software and/or requests updated transaction information. Other financial accounts may not have electronic communication capabilities established and, therefore, may require the consumer to manually enter transaction data into the personal finance software.

With account information for multiple financial accounts entered into the personal finance software, the personal finance software can be very useful in tracking transactions, balances, and trends across multiple financial accounts associated with the consumer. However, consumers are opening an increasing quantity of per capita financial accounts, such as credit card, checking, saving, loan, investment, and specialty store credit accounts, to the point that a single consumer, or consumer's family unit, may easily have ten, twenty, or more financial accounts that they wish to track in personal finance software. In order to begin tracking these multiple financial accounts, though, the consumer must first remember all of the accounts that they have opened, and second, must manually provide all of their account information into the personal finance software, such as by locating statements associated with the various accounts and copying account information into the personal finance software. This process of setting up accounts in the consumer's personal finance software can be tedious and may motivate the consumer not to bother tracking their less frequently used financial accounts in the personal finance software. Additionally, the consumer may forget to provide account information for new accounts that have been established after they have already set-up their pre-existing accounts with their personal finance software.

SUMMARY OF THE INVENTION

In one embodiment, a computing system for providing financial account information to a personal finance software application comprises an account detection module configured to retrieve a credit report associated with a consumer and to detect each of a plurality of financial accounts indicated in the credit report, and a personal finance software integration module configured to generate account data for transmission to the personal finance software application of the consumer, wherein the account data comprises information regarding the detected financial accounts in a format that is usable by the personal finance software in order to add the detected financial accounts into the personal finance software application.

In one embodiment, a computerized method of providing financial account information to a personal finance software application comprises retrieving financial information associated with a consumer, detecting one or more financial accounts indicated in the financial information, and generating one or more account data for transmission to the personal finance software application, each of the account data indicating at least an account identifier and an account type for a respective financial account of the one or more financial accounts.

In one embodiment, a method of providing financial account information to a personal finance software application for auto-population in the personal finance software application comprises receiving consumer information identifying a consumer, the consumer information comprising at least one of a consumer's name, social security number, and residence address, transmitting at least some of the consumer information to a credit data service, receiving credit information associated with the consumer from the credit data service, detecting one or more financial accounts in the received credit information, the financial accounts selected from the group comprising credit card, checking, saving, loan, investment, and specialty store credit financial accounts, determining one or more account data formats that are readable by the personal finance software, formatting information associated with the detected one or more financial accounts into at least one of the account data formats, wherein the information comprises at least an account name for each of the detected financial accounts, and transmitting the formatted information to the personal finance software application.

In one embodiment, a computer-readable storage medium contains a set of instructions that causes a computer to perform a method comprising receiving consumer information identifying a consumer, the consumer information comprising at least one of a consumer's name, social security number, and residence address, transmitting at least some of the consumer information to an integration device, receiving account information from the integration device, wherein the account information is extracted from a credit report associated with the consumer, and initiating creation of accounts in a personal finance software application corresponding to the received account information.

BRIEF DESCRIPTION OF THE DRAWINGS

These and other features will now be described with reference to the drawings summarized below. These drawings and the associated description are provided to illustrate a preferred embodiment of the invention, and not to limit the scope of the invention.

DETAILED DESCRIPTION OF CERTAIN EMBODIMENTS

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions described herein.

Figure 1A:
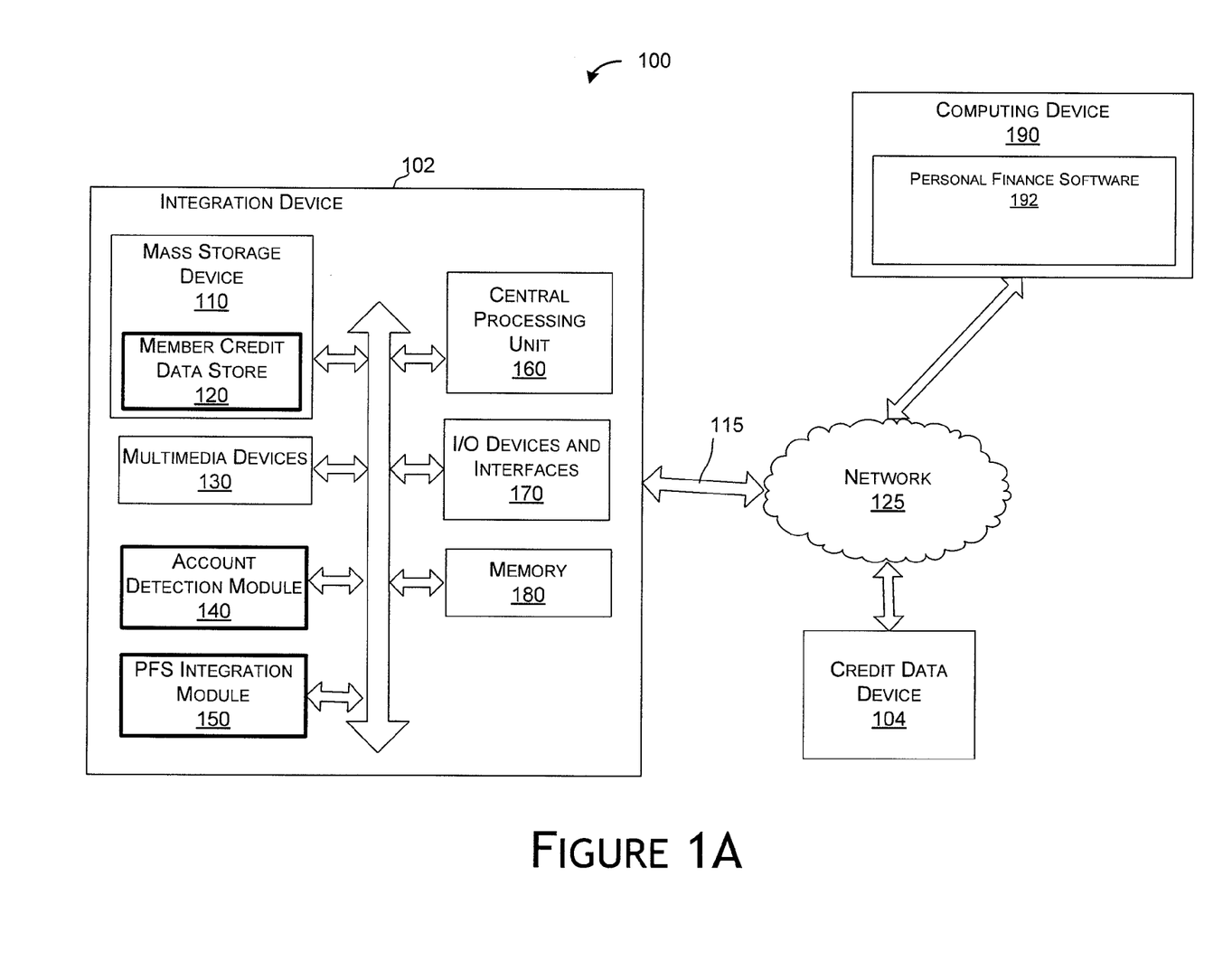
FIG. 1A is a block diagram illustrating one embodiment of an integration device coupled to a network in communication with a computing device having personal finance software.

FIG. 1A is a block diagram illustrating one embodiment of an integration device 102 coupled to a network 125 in communication with a computing device 190 executing personal financial software 192. In the embodiment of FIG. 1A, the integration device 102 is also in communication with a credit data device 104 that is configured to provide financial data regarding consumers to the integration device 102, such as in the format of a credit report. The integration device 102 is configured to receive financial data associated with consumers, extract account information from the financial data, and provide the account information to the corresponding consumer in a format that is usable in the particular consumer's personal finance software 192. In the embodiment of FIG. 1A, the integration device 102 communicates with the computing device 190 and the credit data device 104 via a network 125, which may comprise one or more wireless and/or wired networks, such as LANs, WANs, and/or the Internet.

In the embodiment of FIG. 1A, computing device 190 is a consumer computing device that executes personal finance software 192, such as Microsoft Money and/or Intuit Quicken, for example. In one embodiment, the personal finance software 192 is configured to communicate with the integration device 102 in order to enroll a consumer in a personal finance integration service, which may allow the consumer to receive information regarding currently open financial accounts and/or to receive periodic updates of new financial accounts that are identified in the consumer's financial information. In one embodiment, the computing device 190 utilizes personal finance software 192 such as Microsoft Money or Intuit Quicken to request, retrieve, modify, and verify financial information related to the user, whereby financial information may include data regarding credit account, debit accounts, and/or other financial data. In one embodiment, the personal finance software provider provides an add-in, plug-in, and/or other software code that interfaces with the consumer's personal finance software 192 so that the personal finance software 192 may appropriately communicate with the integration device 102.

In general, a module, as used herein, refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. Generally, the modules described herein refer to logical modules that may be combined with other modules or divided into sub-modules despite their physical organization or storage. Additionally, the functionality provided for in the modules described herein may be combined into fewer components and modules or further separated into additional components and modules. Components or modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In one embodiment, the integration device 102 includes, for example, a server or a personal computer that is IBM, Macintosh, or Linux/Unix compatible. In another embodiment, the integration device 102 comprises a laptop computer, cellular phone, personal digital assistant, kiosk, or audio player, for example. In one embodiment, the exemplary integration device 102 includes a central processing unit ("CPU") 160, which may include a conventional microprocessor. The integration device 102 further includes a memory 180, such as random access memory ("RAM") for temporary storage of information and a read only memory ("ROM") for permanent storage of information, and a mass storage device 110, such as a hard drive, diskette, or optical media storage device. Member credit data store 120 is stored in the mass storage device 110. In one embodiment, the member credit data store 120 may be financial information that has been retrieved, analyzed, and distributed to the end user's computing device 190. In another embodiment, the member credit data store 120 may be financial information that has been retrieved, un-analyzed, and pending for processing by a personal finance software (PFS) integration module 150, which is described in further detail below.

The integration device 102 is generally controlled and coordinated by operating system software, such as the Windows 95, 98, NT, 2000, XP, Vista, Linux, SunOS, Solaris, PalmOS, Blackberry OS, or other compatible operating systems. In Macintosh systems, the operating system may be any available operating system, such as MAC OS X. In other embodiments, the device 102 may be controlled by a proprietary operating system. Conventional operating systems control and schedule computer processes for execution, perform memory management, provide file system, networking, and I/O services, and provide a user interface, such as a graphical user interface ("GUI"), among other things.

The exemplary integration device 102 includes one or more commonly available input/output (I/O) devices and interfaces 170, such as a keyboard, mouse, touchpad, and printer. In one embodiment, the I/O devices and interfaces 170 include one or more display device, such as a monitor, that allows the visual presentation of data to a user. More particularly, a display device provides for the presentation of GUIs, application software data, and multimedia presentations, for example. The integration device 102 may also include one or more multimedia devices 130, such as speakers, video cards, graphics accelerators, and microphones, for example.

In the embodiment of FIG. 1A, the I/O devices and interfaces 170 provide a communication interface to various external devices. In the embodiment of FIG. 1A, the integration device 102 is in communication with a network 125, such as any combination of one or more LANs, WANs, or the Internet, for example, via a wired, wireless, or combination of wired and wireless, via the communication link 115. The network 125 communicates with various computing devices and/or other electronic devices via wired or wireless communication links. In the exemplary embodiment of FIG. 1A, the network 125 is in communication with computing device 190 such as desktop, laptop, or mobile computing devices.

In the embodiment of FIG. 1A, the integration device 102 also includes the PFS integration module 150 and an account detection module 140 that may be executed by the central processing unit (CPU) 160. In one embodiment, the account detection module 140 retrieves credit reports, and/or other financial data that is available from the credit data device 104, for consumers and extracts financial account information from the credit reports. In one embodiment, the PFS integration module 150 formats and/or translates the account information from the account detection module 140 into a format that is usable by the consumer's personal finance software 192 and communicates the account information to the personal finance software 192. Accordingly, the personal finance software 192 is provided with information regarding each of a plurality of financial accounts that are associated with the consumer so that the account information may be populated in the personal finance software 192 with minimal effort by the consumer. In one embodiment, the account information from the integration device 102 also includes information that is usable by the personal finance software 192 in establishing a secure communication link with respective originators of the consumer's financial accounts.

Figure 1B:
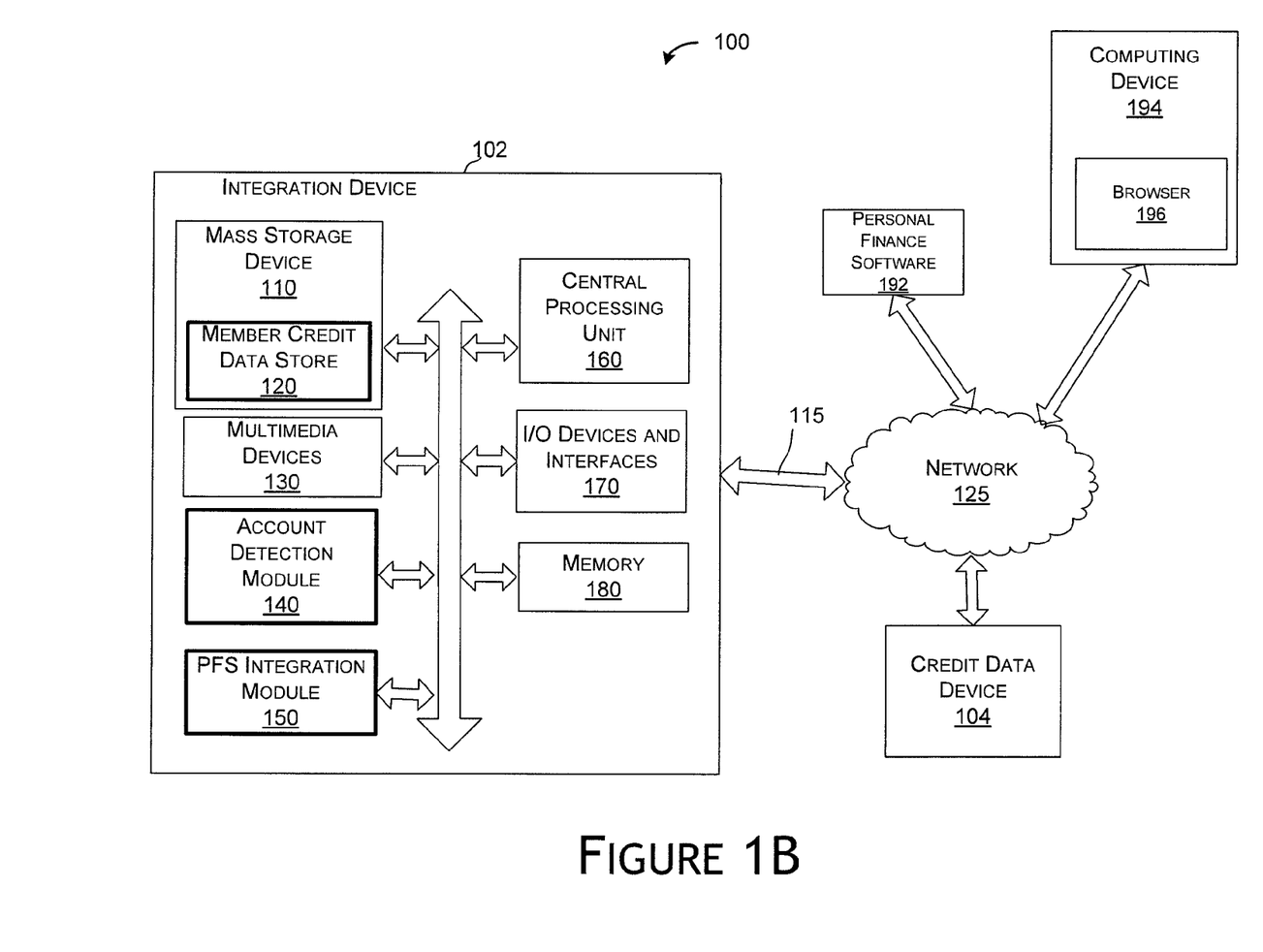
FIG. 1B is a block diagram illustrating one embodiment of an integration device coupled to a network in communication with a computing device having a web browser.

FIG. 1B is a block diagram illustrating one embodiment of the integration device 102 coupled to the network 125, which is in communication with a computing device 194 having a browser 196 configured to interface with personal finance software 192 in order to provided personal finance information to the user via the browser 196. For example, the computing device 194 may utilize the browser 196 in accessing Microsoft Money online or Inuit Quicken online to request, retrieve, display, modify, and verify financial information related to the user. In FIG. 1B, the integration device 102 is configured to receive financial data associated with consumers, extract account information from the financial data, and provide the account information to the corresponding consumer in a format that is usable in the particular consumer's web based personal finance software 192. In FIG. 1B, by means of the network 125, the account detection module 140 retrieves financial information that is available from the credit data device 104 and extracts financial account information from the received financial information. The PFS integration module 150 may then format and/or translate the account information from the account detection module 140 into a format that is usable by the personal finance software 192, such that the account information may be easily added to the consumer's account and accessed by the user via the browser 196.

Figure 2:
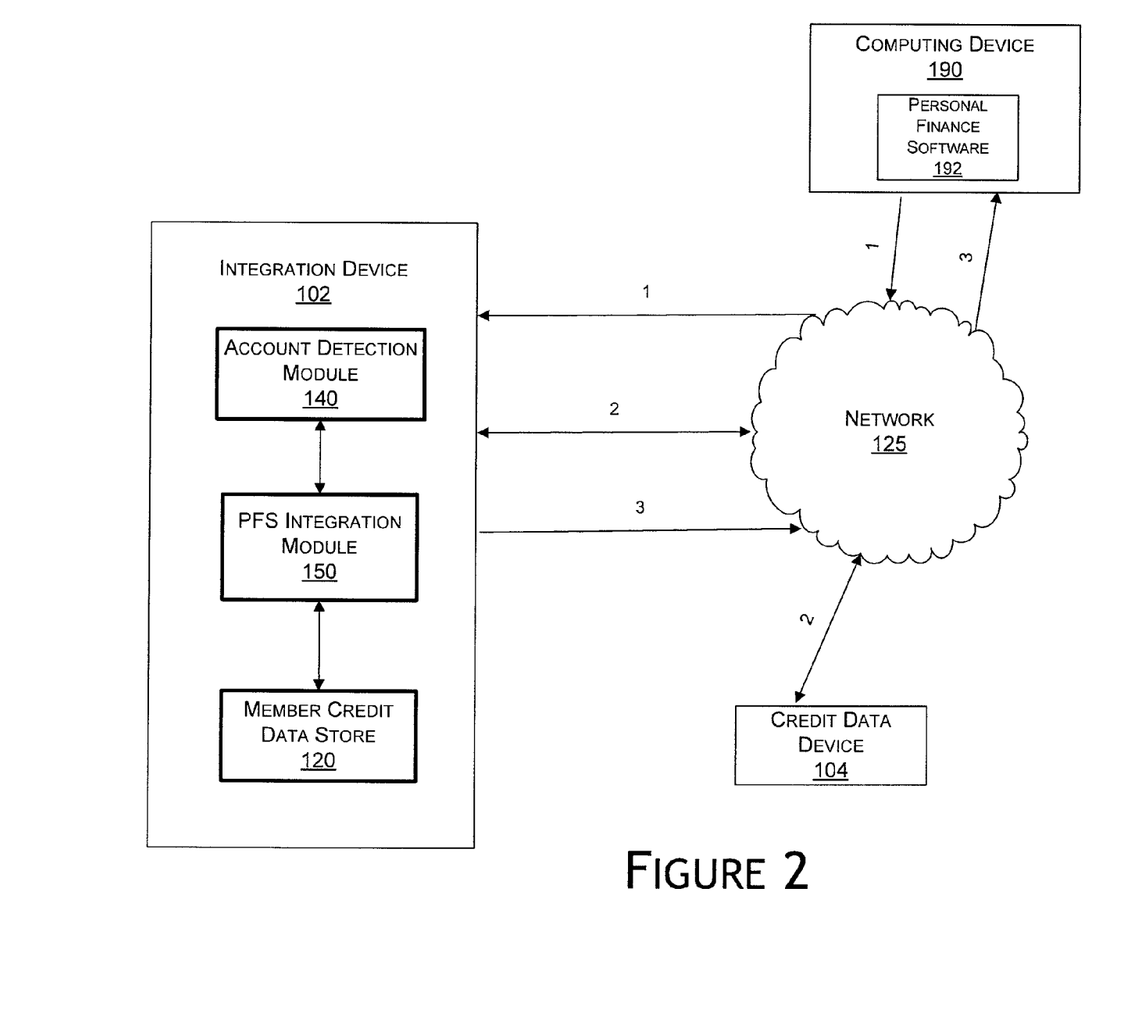
FIG. 2 is a block diagram illustrating one embodiment of an integration device in communication with a consumer computing device.

FIG. 2 is a block diagram illustrating one embodiment of the integration device 102 in communication with a consumer computing device 190 having personal finance software 192 installed thereon. FIG. 2 illustrates an exemplary data flow between the computing device 190, the integration device 102, and the credit data device 104 that results in providing of financial account information for integration with the consumer's personal finance software 192. Those of skill in the art will recognize that the data flow illustrated in FIG. 2 may be adapted to provide financial account information to personal finance software that is remote to the user's computing device and is accessible via a web browser, for example.

In step 1 of FIG. 2, the personal finance software 192 requests financial account information from the integration device 102. In one embodiment, the consumer is provided with an enrollment form that allows the consumer to receive financial account information that is immediately available and/or available at predetermined intervals in the future. In step 2, upon receipt of the request and possibly confirming enrollment of the consumer in an integration program and/or payment of a one-time fee for receiving account information, the consumer information is transmitted to the credit data device 104, such as by sending a request through the network 125 to the credit data device 104, with a request for financial information regarding the consumer, such as a credit report. In one embodiment, the credit data device 104 comprises consumer financial data from one or more credit bureaus. In one embodiment, the integration device 102 communicates with multiple credit data devices 104 that comprise financial data from different credit bureaus and/or other entities that collect information about the creditworthiness of individuals. In response to receiving the request, the credit data device 104 transmits the requested financial data to the integration device 102.

Continuing to step 3 in FIG. 2, the account detection module 140 analyzes the received financial data and extracts any financial account information that might be of interest to the consumer. In one embodiment, the consumer establishes rules indicating which accounts the consumer is interested in auto-populating in their personal finance software 192. For example, a first consumer may indicate that only credit card accounts should be located, while another consumer may indicate that all open accounts with an outstanding balance should be located and provided to the consumer's personal finance software 192. In other embodiments, rules based on any other attributes associated with financial accounts may be established by the consumer. After the account detection module 140 has located one or more financial accounts in the returned financial data, the PFS integration module 150 formats the located account information into a format that is usable by the particular personal finance software 192 of the consumer. Finally, the integration device 102 transmits the account information of the consumer to the personal finance software 192.

In one embodiment, the integration device 102 is configured to periodically access the consumer's financial information and forward any financial accounts that are indicated therein. Thus, automatic updates or notifications regarding financial accounts associated with the consumer may be periodically transmitted from the integration device 102 to the personal finance software 192, either automatically based on a particular service in which the consumer is enrolled, or at the request of the user of the computing device 190.

Figure 3:
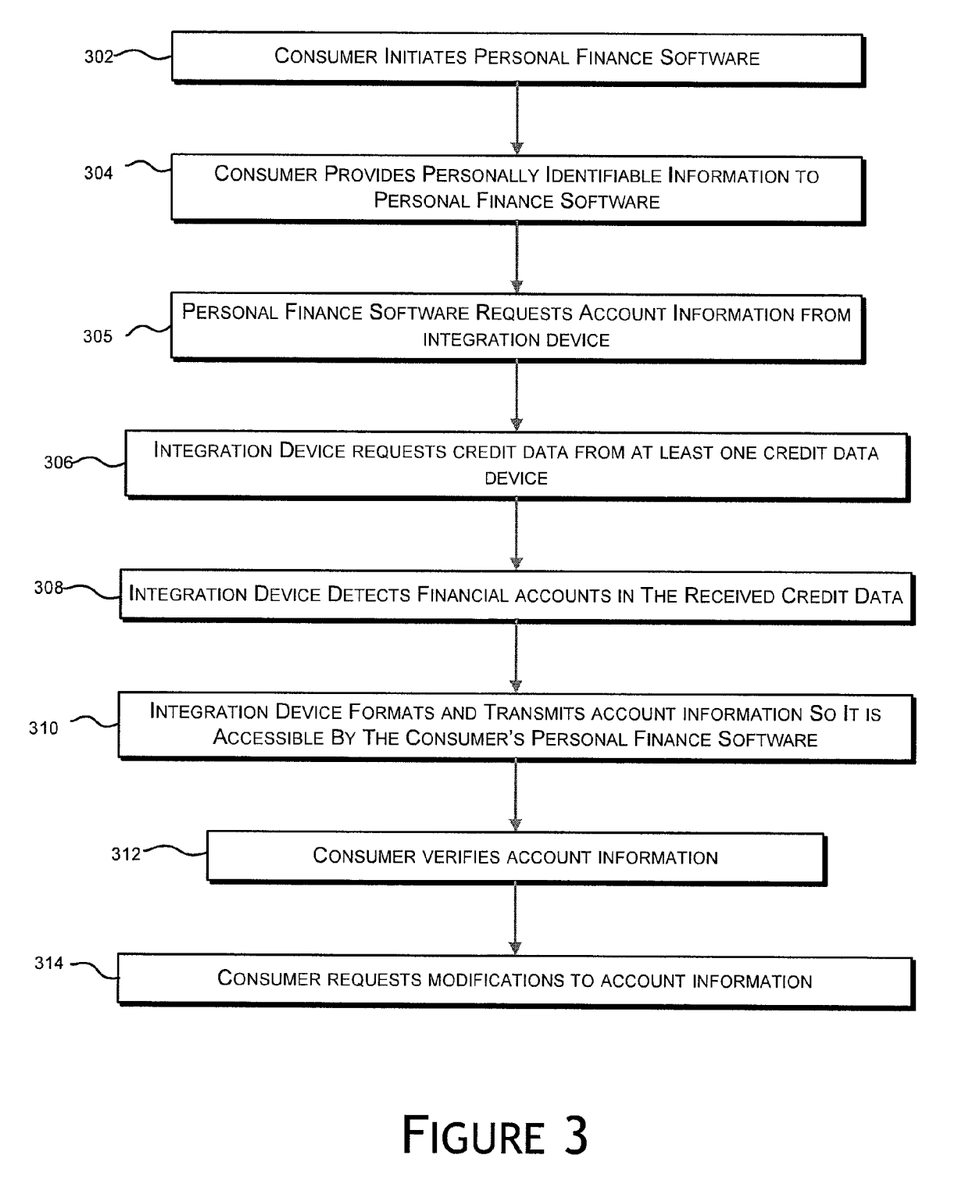
FIG. 3 is a flowchart illustrating one embodiment of a method for integrating personal finance accounts into personal finance software.

FIG. 3 is a flowchart illustrating one embodiment of a method for integrating personal finance accounts into personal finance software. Depending on the embodiment, the method of FIG. 3 may include fewer or additional blocks and the blocks may be performed in a different order than is illustrated.

Beginning in block 302, the consumer initiates personal finance software 192. The personal finance software 192 may be a stand alone application residing on a personal computer (e.g., FIG. 1A) or a web based application accessible by a web browser 196 (e.g., FIG. 1B).

In block 304, the consumer provides personally identifiable information ("PII") to the personal finance software 192. In one embodiment, the PII provided by the consumer comprises either a social security number or both a name and address of the consumer. In other embodiments, other PII, such as address, birth date, spouse, etc., may be requested by the personal finance software 192 and used by the integration device 102 in acquiring financial data associated with the consumer.

In block 305, at least some of the PII is transmitted from the personal finance software 192 to the integration device 102 with a request for financial account information associated with the consumer.

In block 306, the integration device 102 requests financial information regarding the consumer from at least one credit data device 104. For example, the integration device 102 may transmit certain PII of the consumer to the credit data device 104 with a request for financial information, such as a credit report, regarding the consumer. In one embodiment, the credit data device 104 comprises credit bureau information, such as information received from a plurality of financial institutions, such as banks, lenders, brokerage firms, credit card companies, and other entities.

In block 308, the account detection module 140 of the integration device 102 locates financial accounts indicated in the financial information returned from the one or more credit data devices 104. In one embodiment, the account detection module 140 locates accounts of interest by checking attributes of financial information that is received. For example, attributes of a financial account may include an account type, payment status, balance, term, maturity date, and/or any other relevant attribute of a financial account. Thus, in an embodiment where a consumer is only interested in adding currently open accounts to their personal finance software, the account detection module 140 may access the account status attributes for any located financial accounts in order to locate only those that are currently active. Likewise, accounts with an outstanding balance may be located by accessing an outstanding balance attribute of located financial accounts. In other embodiments, any other attributes may be accessed in order to selectively extract information regarding financial accounts.

In one embodiment, the integration device 102 comprises a de-dupe module that is configured to locate and remove duplicate account information. In another embodiment, the de-dupe module may be part of the credit data device 104 and/or the personal finance software 192.

In block 310, the PFS integration module 150 of the integration device 102 formats the detected account information so that the account information is usable by the particular personal finance software that requested the account information. As those of skill in the art will recognize, personal finance software from different vendors may require different formats for account information. Thus, the PFS integration module 150 formats and/or translates the account information into a data stream format that is usable by the personal finance software 192 that is installed on the particular customer's computing device and/or to the personal finance software that is accessed by the consumer's web browser 196. In one embodiment, the integration device 102 may store the account information and/or other portions of the financial information received from the credit data device 104 on the mass storage device 110 for later retrieval by the computing device 190, 194. In one embodiment, the account information that is transmitted to the personal finance software may be supplemented with information not in the financial information from the credit data device, but obtained by the PFS integration module 150 from other data sources. For example, the integration device 102 may provide information identifying the financial institutions, such as Internet IP addresses and customer login protocols, that may be used by the personal finance software 192 in setting up an electronic link with the financial institutions. After formatting and/or supplementing the account information, if required, the PFS integration module 150 transmits the account information to the personal finance software for auto-population of the accounts in the personal finance software. In certain embodiments, the account information extracted from the financial information is transmitted directly to the personal finance software without formatting, translation, or supplementation.

In block 312, the consumer may be provided with an opportunity to verify the account information prior to integration of the accounts into the personal finance software. In one embodiment, the consumer is able to select financial accounts that are to be integrated into the personal finance software so that only selected financial accounts are integrated into the personal finance software 192. Additionally, in block 314 the consumer may change information associated with accounts located by the integration device 102, such as changing the name of an account or the type of account within the personal finance software 192, and may be provided with an opportunity to manually add financial accounts that are not included in the account information returned from the integration device 102. In one embodiment, the account information from the integration device 102 also includes information that is usable by the personal finance software 192 in establishing an electronic link to one or more financial institutions associated with the located accounts so that transaction data may be securely transmitted from the financial institutions to the personal finance software 192, for example.

Figure 4:
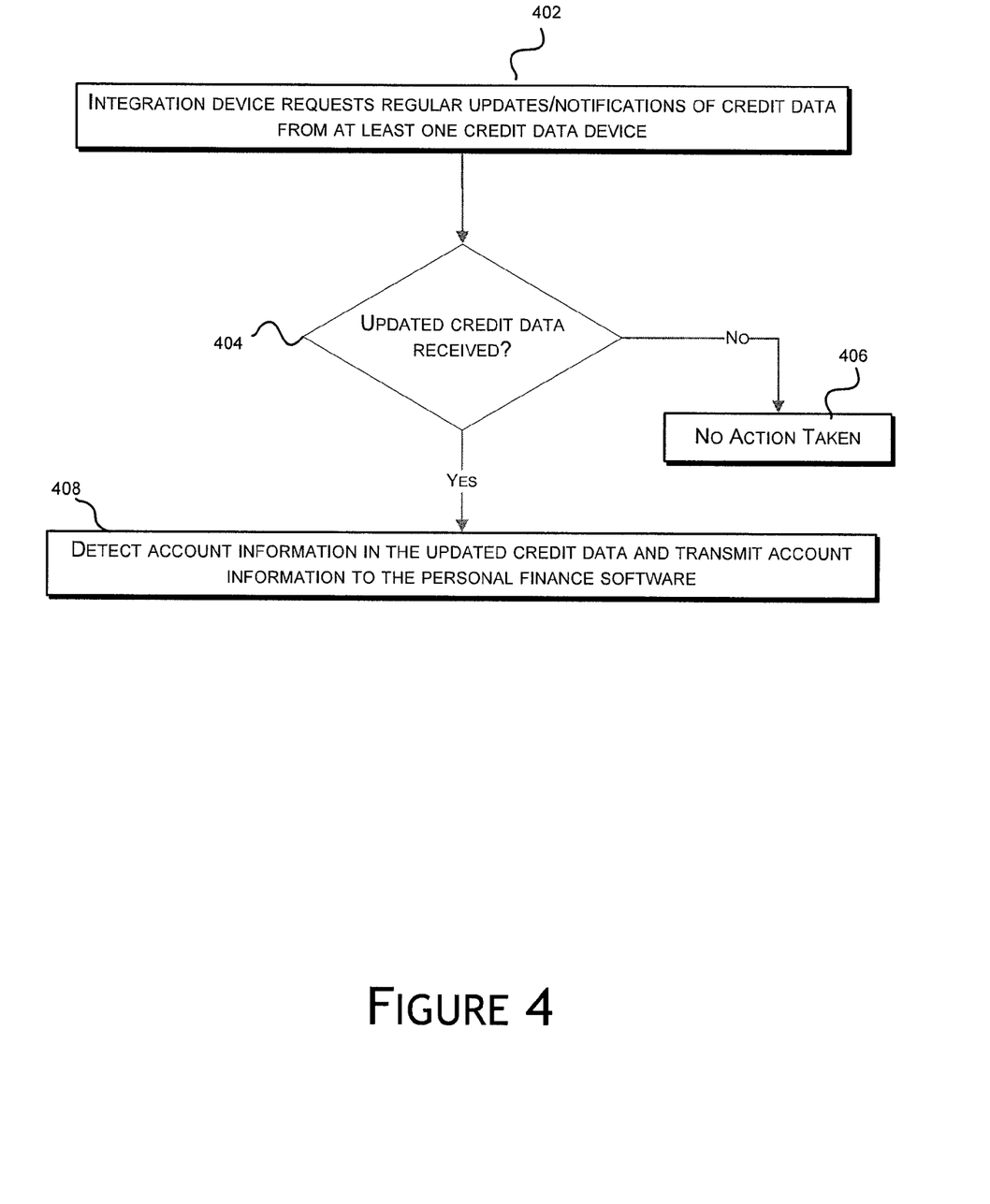
FIG. 4 is a flowchart illustrating one embodiment of a method for periodically updating the personal finance software with newly established financial accounts associated with the consumer.

FIG. 4 is a flowchart illustrating one embodiment of a method for periodically updating the personal finance software with newly established financial accounts associated with the consumer. Depending on the embodiment, the method of FIG. 4 may include fewer or additional blocks and the blocks may be performed in a different order than is illustrated.

In block 402, the integration device 102 requests regular updates/notifications of credit data from at least one credit data device 104. For example, the consumer may enroll in an account monitoring service wherein the integration device 102 may be configured to request periodic credit reports, or other financial data, for a consumer, such as on a daily, weekly, monthly, or quarterly basis. In certain embodiments, the consumer may request updated account information at any time, such as via the personal finance software 192.

Next, in block 404, the integration device 102 periodically requests financial information and detects if new financial information is available. If the financial information has changed, such as by fewer or additional financial accounts being included in a credit report of the consumer, the method continues to block 408 where specific changes to financial accounts is detected. If financial account information has been modified, the modified account information, such as new account information, is transmitted to the personal finance software.

Figure 5:
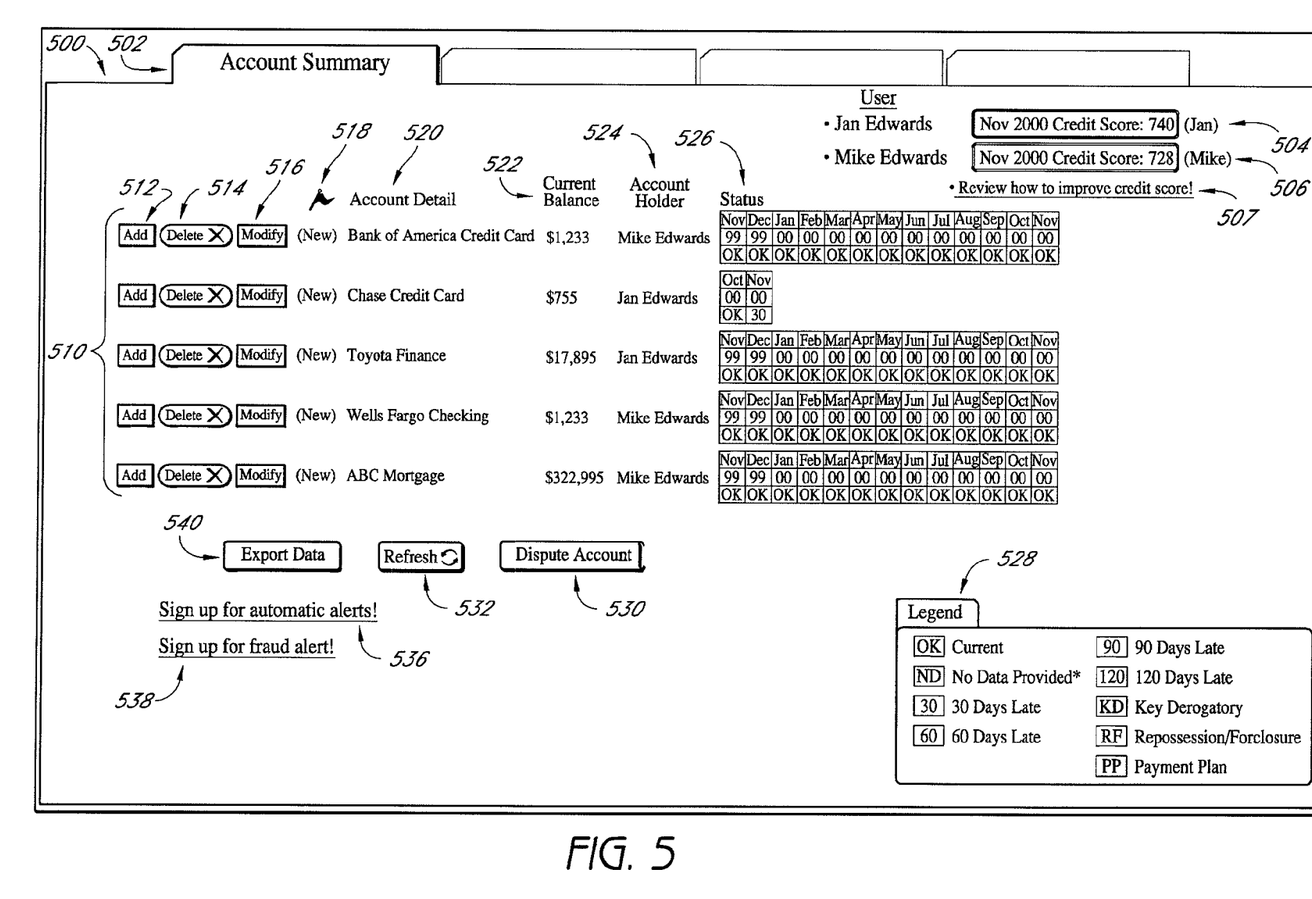
FIG. 5 illustrates an exemplary personal finance software user interface illustrating a consumer's account summary.

FIG. 5 is an exemplary personal finance software user interface 500 illustrating a consumer's account summary. Depending on the embodiment, a user interface similar to the user interface 500 may be generated by personal finance software installed on the consumer's computing device or accessible via a web browser, for example.

As discussed above, a personal finance integration service, such as may be provided by the integration device 102, provides information to consumers regarding their existing financial accounts and allows the consumer to automatically populate a personal finance software program, such as Microsoft Money or Inuit Quicken, with information regarding the accounts. For example, the personal finance integration service may extract financial account information from a credit report of the consumer for auto-population in the personal finance software. FIG. 5 illustrates an exemplary account summary interface 502 that displays account information located for a consumer and allows the consumer to select one or more of the located financial accounts for integration with the personal finance software 192. As illustrated in FIG. 5, the account summary interface 502 displays account data of two consumer, merged into one account summary report. In another embodiment, the account summary interface 502 may display account data for only one user or for additional related users.

The exemplary account summary interface 502 includes information regarding a plurality of financial accounts 510 located by the integration device 102, for example. As illustrated in FIG. 5, information associated with each of the located financial accounts may be included in an Add account column 512, a Delete account column 514, a Modify account column 516, and an account type column 518. In one embodiment, the consumer indicates accounts that are to be integrated into the personal finance software by selecting the Add button (e.g., in the Add account column 512) associated with the financial accounts. In other embodiments, other form controls, such as checkboxes or radio buttons, for example, may be used in order to allow the consumer to indicate which of the located accounts should be added to their personal finance software. In one embodiment, the user may modify account information, such as an account name, by selecting the appropriate Modify button in the Modify account column 516.

In the embodiment of FIG. 5, the account summary interface 502 includes account details, such as an account name 520, a current balance 522, an account holder's name 524, and an account status 526. In other embodiments, the account details may include fewer details or additional details, such as a monthly interest payment, an interest rate, or other account detail available from the consumer's financial information. In one embodiment the account type column 518 indicates a status of located financial accounts, where flag indicators may include new, pre-existing, and duplicate, for example. Thus, the consumer can easily determine which accounts were located in updated financial information, for example. In one embodiment, the account summary interface 502 lists only new financial accounts, e.g., accounts that were not previously presented to the consumer for inclusion in their personal finance software, and there is no need for a flag column.

In the embodiment of FIG. 5, the status column 526 indicates a payment status of the listed financial accounts. The status 526 of financial accounts may be updated on a regular basis, such as each time the consumer accesses the personal finance software. The account summary interface 502 includes a legend 528 noting the meaning of status indicators in the status column 526. In one embodiment, the status of an account may be "current", "no data provided", "30 days late", "60 days late", "90 days late", "120 days late", "key derogatory", "repossession/foreclosure", or "payment plan", for example. In other embodiments, other payment statuses may be indicated.

In one embodiment, the account summary interface 502 provides a dispute account button 530 that allows the user to provide information to one or more credit bureaus, for example, regarding financial account detail that may be invalid or may need modification. Also, in one embodiment the user may select a fraud alert link 538 to initiate communication with one or more credit bureaus regarding establishment of a fraud alert associated with the users credit file. In one embodiment, the user may select an alert link 536 that initiates establishment of alerts associated with the consumer's financial accounts, such as by electronic mail, text messages, telephone call, or conventional mail. The alerts may be associated with rules that trigger transmission of an alert based on any activity of one or more financial accounts, such as when a financial account has a payment status of 30 Days late or worse, or when a current balance exceed a predetermined threshold. The alert rules may be established for individual accounts, groups of accounts, or globally.

In the embodiment of FIG. 5, the account summary interface 502 illustrates a current credit scores 504 and 506 associated with the at least users. In one embodiment, the personal finance software 192 and/or the integration device 102 may track changes to the credit scores 504 and 506 so that the consumer may view historical trends in their credit score(s). The personal finance integration service may offer additional features, such as, for example, a credit score improvement advise link 507 that provides the consumer with suggestions regarding how to improve their credit score(s). For example, when the link 507 is selected by the consumer, a software component or module within the integration device 102 and/or personal finance software 192 may analyze the consumer's current financial profile and offer suggestion on ways to improve a credit score.

In one embodiment, the account summary interface 502 includes an export data button 540 that initiates exportation of financial account data in a variety of different formats to an external memory location or computing device. In one embodiment, the personal finance software 192 and/or integration device 102 is able to export account data in Quicken Interchange Format (QIF) or Comma-Separated Values (CSV) format.

Figure 6:
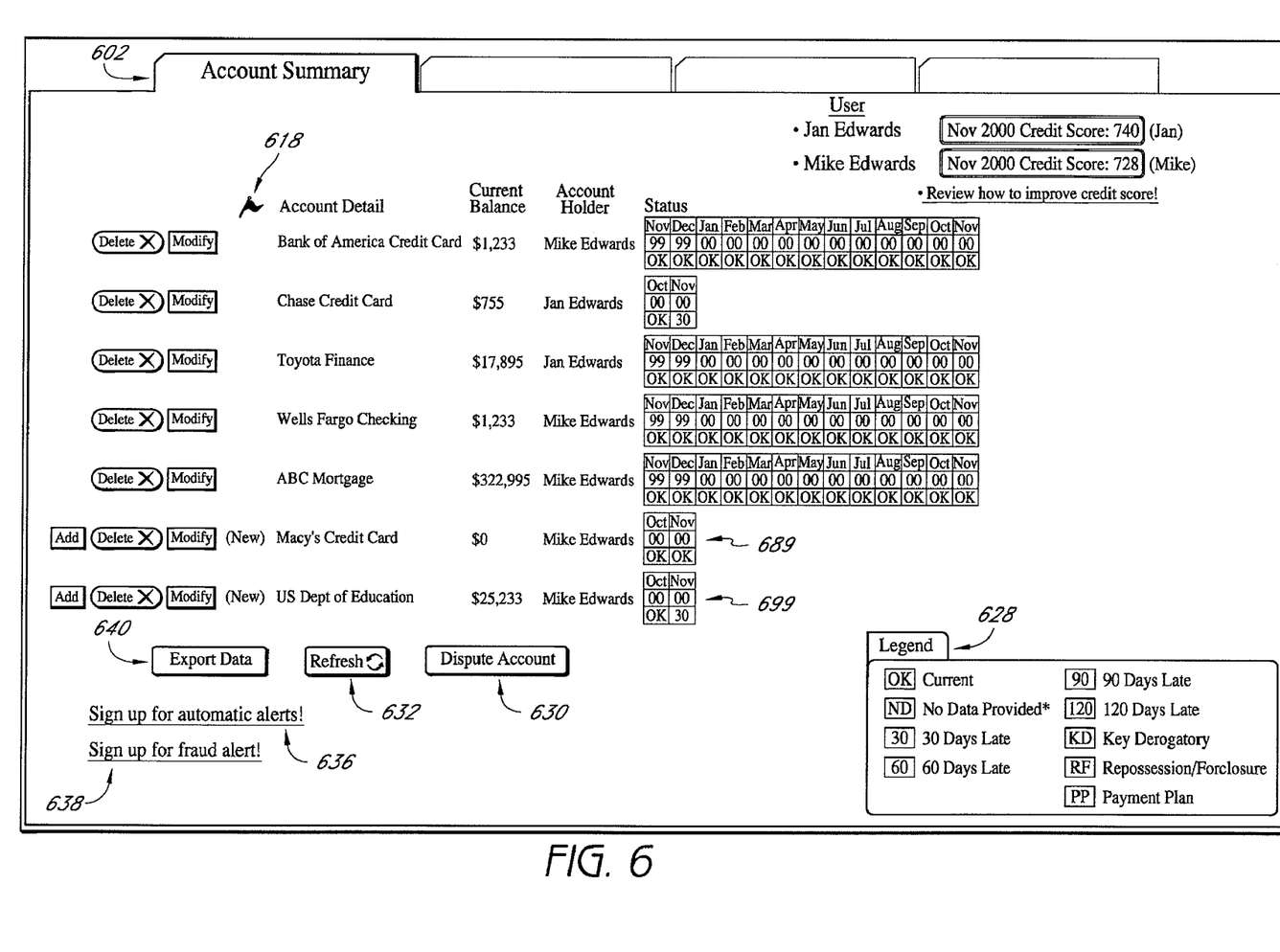
FIG. 6 illustrates an exemplary personal finance software user interface illustrating a consumer's account summary including updated financial account information.

FIG. 6 illustrates an exemplary account summary interface 602 illustrating a consumer's account summary including updated financial account information. The account summary interface 602 includes financial accounts that have already been integrated into the personal finance software 192 by the integration device 102 and/or manually by the consumer, as well as newly located financial accounts that may be integrated into the personal finance software 192. Depending on the embodiment, a user interface similar to the consumer's account summary interface 602 may be generated by personal finance software 192 installed on the consumer's computing device 190 or accessible via a web browser 196, for example.

In the exemplary user interface 602, the account type column 518 indicates that two of the listed accounts are "new", indicating that the remaining accounts were previously located by the integration device 102. In one embodiment, the integration device 102 performs a periodic monitoring of available financial account information (e.g., FIG. 4) and notifies the consumer only when one or more new accounts have been located. In one embodiment, the consumer may initiate an update at any time. In the user interface 602, new accounts 689, 699 are indicated and the consumer is provided the opportunity to integrate the accounts into their personal finance software 192.

All of the processes described above may be embodied in, and fully automated via, software code modules executed by one or more general purpose computers. The code modules may be stored in any type of computer-readable medium or other computer storage device. Some or all of the methods may alternatively be embodied in specialized computer hardware. As will be apparent, the features, and attributes of the specific embodiments disclosed above may be combined in different ways to form additional embodiments, all of which are within the scope of the present disclosure. Although this invention has been described in terms of certain embodiments and applications, other embodiments and applications that are apparent to those of ordinary skill in the art, including embodiments which do not provide all of the features and advantages set forth herein, are also within the scope of this invention.

What is claimed is:

1. A system for providing financial account data for auto-population in an existing, widely-used personal finance software application used by a consumer, the system comprising:
a computer processor configured to implement:
an account detection module configured to
retrieve credit and debit information associated with a consumer from a credit/debit data integration service configured to receive, relative to the consumer, both credit data from a credit bureau identifying the credit accounts of the consumer as well as debit data from banks identifying the debit accounts of the consumer;
detect each of a plurality of financial accounts indicated in the credit and debit information;
detect one or more account rules associated with the consumer indicating which of the financial accounts indicated in the credit and debit information should be included in financial account data for transmission to the existing, widely-used personal finance software application; and
extract, from the credit and debit information, financial account data matching the account rules; and
a personal finance software integration module configured to generate a data file comprising the extracted account data for transmission to the existing, widely-used personal finance software application of the consumer, wherein the data file comprises information regarding the indicated financial accounts in a format that is usable by the existing, widely-used personal finance software application in order to add the data file regarding the financial accounts into the existing, widely used personal finance software application.

2. The system of claim 1, wherein the personal finance software application executes on a server in communication with a browser executing on a consumer computing device.

3. The system of claim 1, wherein the personal finance software executes on a consumer computing device.

4. The system of claim 1, wherein the financial accounts comprise one or more of credit card, checking, savings, loan, investment, and specialty store credit accounts.

5. A method of providing financial account information to a personal finance software application for auto-population in an existing, widely-used personal finance software application provided by a third party, the method comprising:
receiving at a computing device comprising at least one processor consumer information identifying a consumer, the consumer information comprising at least one of a consumer's name, social security number, and residence address;
transmitting from the computing device at least some of the consumer information to a credit/debit data service, wherein the credit/debit data service comprises a personal credit and debit account integration service which receives, relative to the consumer, both credit data from a credit bureau identifying the credit accounts of the consumer as well as debit data from banks identifying the debit accounts of the consumer, the credit and debit data being stored in the integration service in a variety of data formats;
receiving at the computing device credit/debit information associated with the consumer from the credit/debit data service, wherein the credit/debit information is in a first format;
detecting by the computing device account information associated with one or more financial accounts in the received credit/debit information, the financial accounts selected from the group comprising credit card, checking, saving, loan, investment, and specialty store credit financial accounts;
detecting by the computing device account rules corresponding to which of the account information is to be auto-populated into the personal finance software;
determining by the computing device a second data format different from the first format that is readable by the personal finance software in order to populate the personal finance software with account information for each of the detected one or more financial accounts;
extracting by the computing device, corresponding to the account rules, the account information associated with the detected one or more financial accounts from the credit information in the first format;
generating by the computing device a data structure in the second data format and including the extracted account information associated with the detected one or more financial accounts,
wherein the extracted account information comprises at least an account name for each of the detected financial accounts; and
providing the data structure in the second data format to the personal finance software application.

6. The computerized method of claim 5, wherein at least one of the account rules indicates one or more account types, balances, or statuses.

7. A computer-readable storage medium containing a set of instructions that, in response to execution by a computing device, causes the computing device to perform operations comprising:
receiving at the computing device consumer information identifying a consumer, the consumer information comprising at least one of a consumer's name, social security number, and residence address;
transmitting from the computing device at least some of the consumer information to a credit data service comprising a personal credit account integration service which receives, relative to the consumer, credit data comprising data from a credit bureau identifying the credit accounts of the consumer;
receiving at the computing device credit information associated with the consumer from the credit data service, wherein the credit information is in a first format;
detecting by the computing device account information associated with one or more financial accounts in the received credit information;
detecting by the computing device account rules corresponding to which of the account information is to be auto-populated into an existing, widely-used personal finance software;
determining by the computing device a second data format different from the first format that is readable by the personal finance software in order to populate the personal finance software with account information for each of the detected one or more financial accounts;
extracting by the computing device, corresponding to the account rules, the account information associated with the detected one or more financial accounts from the credit information in the first format;

generating by the computing device a data structure in the second data format and including the extracted account information associated with the detected one or more financial accounts, wherein the extracted account information comprises at least an account name for each of the detected financial accounts; and providing the data structure in the second data format to the personal finance software application.

8. The computer-readable storage medium of claim 7, wherein the existing, widely-used personal finance software application executes on a server in communication with a browser executing on a consumer computing device.

9. The computer-readable storage medium of claim 7, wherein the personal finance software executes on a consumer computing device.

10. The computer-readable storage medium of claim 7, wherein the account information comprise information associated with one or more of credit card, checking, saving, loan, investment, and specialty store credit accounts.

11. The computer-readable storage medium of claim 7, wherein the operations further comprise receiving information from the consumer computing device disputing account information extracted from the credit report.

* * * * *